(12) United States Patent
Sugiyama et al.

(10) Patent No.: US 6,401,567 B1
(45) Date of Patent: Jun. 11, 2002

(54) STEERING WHEEL (75) Inventors: Toshiyuki Sugiyama; Kazuhiro Kaneko; Shuji Yamada; Yuichi Kato, all of Shizuoka (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 09/523,294

(22) Filed: Mar. 10, 2000

(30) Foreign Application Priority Data

Mar. 15, 1999 (JP) .......................................... 11-068846

(51) Int. Cl.$^7$ ................................................. G05G 1/10
(52) U.S. Cl. ........................................................ 74/558
(58) Field of Search ................... 74/552, 558, 558.5, 74/557; 200/61.54, 61.55, 61.56, 61.57

(56) References Cited

U.S. PATENT DOCUMENTS

| | | | | |
|---|---|---|---|---|
| 3,823,618 A | * | 7/1974 | Broyer | ........................ 74/552 |
| 4,590,340 A | * | 5/1986 | Koike et al. | ............... 74/552 X |
| 6,065,366 A | * | 5/2000 | Koyama et al. | ............... 74/552 |

FOREIGN PATENT DOCUMENTS

| | | | | |
|---|---|---|---|---|
| DE | 298 03 133 U1 | | 5/1998 | |
| DE | 198 46 824 C1 | | 4/2000 | |
| JP | 48-77829 | | 9/1973 | |
| JP | 53-40928 | | 4/1978 | |
| JP | 53-96128 | | 8/1978 | |
| JP | 57-92575 | | 6/1982 | |
| JP | 0164265 | * | 9/1984 | ................. 74/552 |
| JP | 0194968 | * | 8/1987 | ................. 74/552 |
| JP | 0176771 | * | 7/1988 | ................. 74/552 |
| JP | 0176772 | * | 7/1988 | ................. 74/552 |
| JP | 404154481 | * | 5/1992 | ................. 74/558 |

OTHER PUBLICATIONS

Translation of Preliminary Report on a German office Action dated Oct. 10, 2001.

* cited by examiner

Primary Examiner—Chong H. Kim
(74) Attorney, Agent, or Firm—Foley & Lardner

(57) ABSTRACT

A steering wheel which has a core, a cover covering at least a part of the core, a mount member mounted on the cover and a finisher mounted on the mount member. The mount member is fixed to the cover, and the finisher is fixed to the cover through the mount member. The finisher is engaged with the mount member. The core, the cover, the mount member and the finisher in combination form a grip of the steering wheel. The cover is lower in hardness than the core. The mount member is higher in hardness than the cover. The mount member is formed through an insert molding method.

12 Claims, 5 Drawing Sheets

STEERING WHEEL

BACKGROUND OF THE INVENTION

1. Field of the Invention

The present invention relates to a steering wheel having a finisher for improving external appearance.

2. Description of the Related Art

Japanese Patent Unexamined Publications Nos. 53(1978)-96128 and 53(1978)40928, and Japanese Utility Model Unexamined Publication No. 57(1982)-92575 disclose various steering wheels each having a separate molding (finisher) mounted on a cover covering a core of the steering wheel, thus improving the external appearance of the steering wheel. In each of these constructions, the cover of synthetic resin is formed with a groove in which the separate molding is press fitted and fixed by bonding, heating or mating. In order to fix the molding to the cover of soft material, these constructions require heating process or soak-in-solvent process, which is obstructive to improvement in production efficiency.

Japanese Utility Model Unexamined Publication No. 48(1973)-77829 discloses a steering wheel having a grip covered with a reinforcing cover piece. The cover piece has an ear-shaped extension which covers a spoke and is screwed thereto, thus lowering degree of design freedom.

In addition to covering the grip of the steering wheel with a leather, mounting a molding on such grip is considered so as to improve the external appearance of the steering wheel. Included in such "cover and molding construction" methods are as follows: covering in advance an entire grip with a leather, followed by cutting the leather in an area occupied by the molding; or covering a grip with a leather that is in advance cut in an area occupied by the molding, followed by mounting the molding. The former method is difficult and requires skillful works, thus being obstructive to improvement in production efficiency. On the other hand, the latter method has issues such as; the larger the cutting area the higher the adhesive strength is required when the leather is sewn to the grip. If this adhesive strength is not high enough, it is difficult to carry out high-strength sewing. In other words, sewing with high tensile force the leather that is partly cut causes the leather's cut edge portion to be exposed from a back surface of the molding. This ends up as a deteriorated external appearance. To prevent this, it is necessary to carry out sewing with comparatively low tensile force.

SUMMARY OF THE INVENTION

It is therefore an object of the present invention to provide a steering wheel presenting an improved external appearance by mounting a separate member on its grip.

According to the present inventions a steering wheel comprises a core, a cover covering at least a part of the core, a mount member mounted on the cover and a finisher mounted on the mount member.

DETAILED DESCRIPTION OF THE EMBODIMENT

FIGS. 1 through 7 shows a steering wheel for a motor vehicle, according to a preferred embodiment of the present invention.

Figure 1:
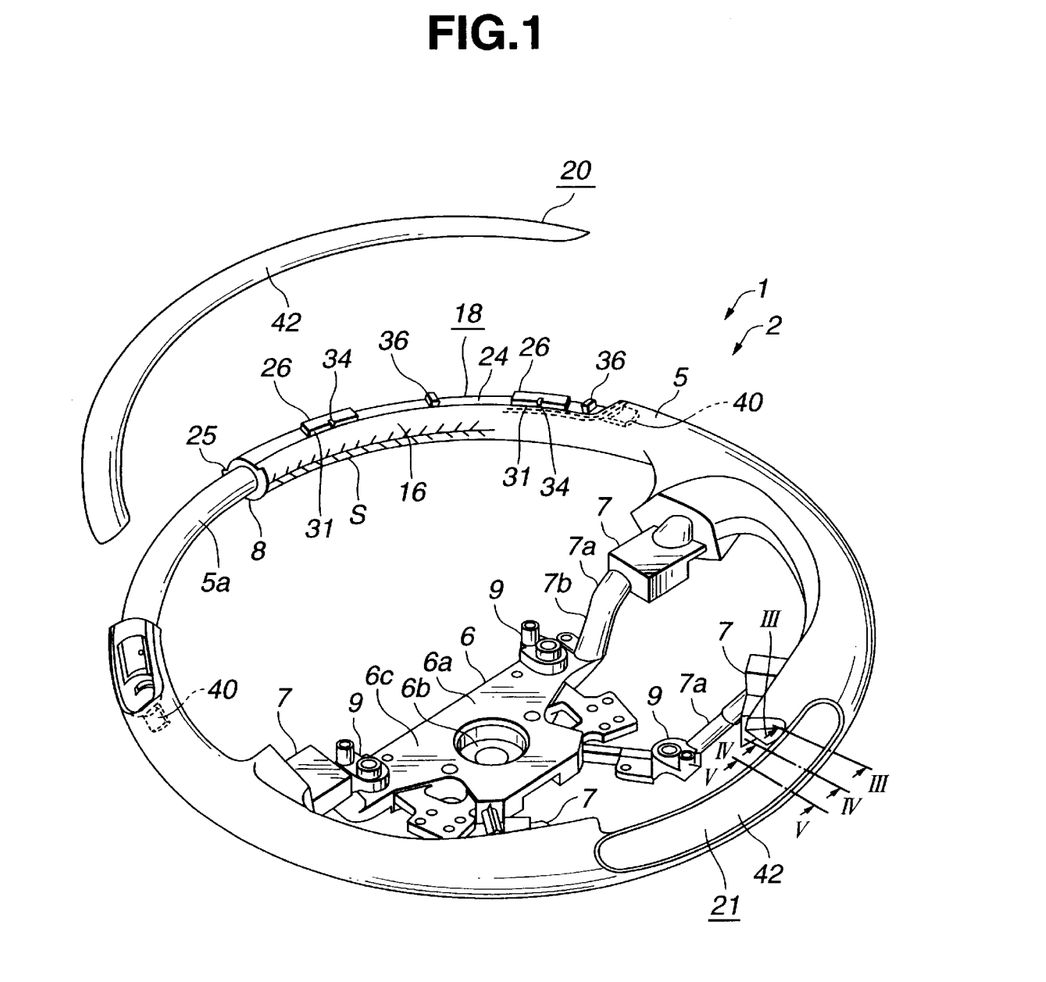
FIG. 1 is a partly exploded perspective view of a steering wheel, according to a preferred embodiment of the present invention.

As shown in FIG. 1, the steering wheel 1 comprises a steering wheel body 2 and a pad body such as an air bag device or air bag module (not shown). The pad body is mounted on an upper side of the steering wheel body 2 toward the vehicular seat occupant. The steering wheel 1 is mounted on a steering shaft that is installed on the motor vehicle usually in an inclined state.

The steering wheel body 2 comprises an annular rim grip 5 or ring portion, a boss portion 6 substantially centered in the rim grip 5 and a plurality of spokes 7 connecting the rim grip 5 and the boss portion 6. In this example, the number of spokes 7 is four. One pair of the spokes 7 are on the right and left sides of the boss portion 6, and the other pair are formed on the near side toward the vehicular seat occupant in such a manner as to form an angle therebetween.

The rim grip 5, boss portion 6 and spokes 7 have respective cores 5a, 6a and 7a. The cores 5a, 6a and 7a are connected with one another, or formed integrally in one piece, thus forming a die-cast core. The rim core 5a, and the spoke cores 7a on the rim grip 5 side are covered with a cover (or sheath) 8.

The boss core 6a is positioned in a lower portion of the boss portion 6. The boss core 6a has a boss 6b which is formed by forging, cutting metal, and/or pressing, and is fitted to the steering shaft. A boss plate 6c is formed integrally with the boss 6b such that the boss 6b is inserted therein.

Each spoke core 7a has a round rod 7b joined to the boss 6b by welding, for example.

The lower portion of the boss portion 6 is covered with a lower cover (not shown) of resin.

Moreover, the steering wheel body 2 comprises a horn switch mechanism. By way of the horn switch mechanism, the air bag device is installed. The horn switch mechanism comprises the following members: guide receptacles 9 having fixed contacts, which guide receptacles 9 being disposed at the spoke cores 7a on both right and left sides on the front side of a boss plate 6c and on both front and rear sides on the rear side of the boss plate 6c; a horn plate (not shown) having a movable contact, which horn plate being configured into a frame, or substantially "U" on a flat; four horn springs for biasing measures; and a shoulder bolt (step bolt) for a fixture. The horn plate, on both sides on the fore side thereof, is guided with a shoulder bolt freely in the progressive-and-retrogressive direction, which shoulder bolt being screwed together with the guide receptacle 9 on both sides on the fore side of the boss plate 6c. Moreover, the horn plate, on both sides on the rear side thereof, is guided with a shoulder bolt freely in the progressive-and-retrogressive direction, which shoulder bolt being screwed together with the guide receptacle 9 disposed at each of the spoke cores 7a on the rear side. Furthermore, the horn plate is movably supported freely in the upward and downward direction in a predetermined area. The horn plate is biased by dint of the horn spring mounted on each of the guide receptacles 9 in a direction in which the movable contact separates from the fixed contact. By movably pushing the air bag device fixed to the horn plate, the movable contact is brought into contact with the fixed contact, thus operating the horn device. The air bag device is constructed in such a manner that a metal base plate is equipped with an air bag, resin cover and an inflator for injecting gas. When the motor vehicle comes into a collision, an inert gas is promptly injected into the air bag from the inflator, thus quickly inflating the air bag which is housed in a folded manner in the air bag device. By dint of an expansion pressure of the air bag, a cover body is developed into a predetermined shape, thus forming a discharge port for the air bag. The air bag is projected from this discharge port, and then expanded toward the vehicular seat occupant, thus protecting the vehicular seat occupant from being impacted at the collision. In case the vehicular seat occupant being so forced forwardly as to cause a load on the rim grip 5, the rim core 5a and spoke core 7a are deformed and moved rearwardly, thus reducing such impact.

As is seen in FIGS. 1 to 7, the rim core 5a of the rim grip 5 is a central structural member fixed with the outer end of each spoke core 7a by welding, and the rim core 5a is covered with the cover 8, and further covered with a skin member 16. Moreover, first and second finishers 20 and 21 are mounted on the cover 8 by way of respective first and second mount members 18 and 19 which are formed by insert molding. The first and second finishers 20 and 21 are positioned, respectively, on the fore side toward the windshield of the vehicle, and the rear side toward the driver. Likewise, the first and second mount members 18 and 19 are positioned, respectively, on the fore and rear sides.

The rim core 5a is made of metal such as magnesium, aluminum or the like, and has a simple configuration such as cylinder.

The cover 8 covers substantially an entire area of the rim core 5a, which cover is made of soft synthetic resin used for polyurethane RIM (reaction injection molding) such as polypropylene, polyvinyl chloride or the like.

The first and second mount members 18 and 19 are made of material, such as resin or metal, having hardness higher than that of the cover 8. Some examples of the resin are; acrylonitrile butadiene styrene copolymer (ABS), acrylonitrile butadiene styrene copolymer containing glass fiber, polycarbonate, acrylonitrile butadiene styrene copolymer containing polycarbonate. Each of the first and second mount members 18 and 19 is of one piece construction. In this embodiment, each of the first and second mount members 18 and 19 is made of acrylonitrile butadiene styrene copolymer containing 10% by weight of glass fiber. The first and second mount members 18 and 19 are firmly fixed to the cover 8 by insert molding in the state in which the first and second mount members 18 and 19 face upwardly.

Each of the first and second mount members 18 and 19 has a main portion 24. The main portion 24 is a curved plate having a long curved surface extending along the rim grip 5 in the shape of a circular arc, and has a cross section curved substantially in the shape of a circular arc. The main portion 24 is fringed with a substantially flat protruding plate-like rim 25.

Figure 2:
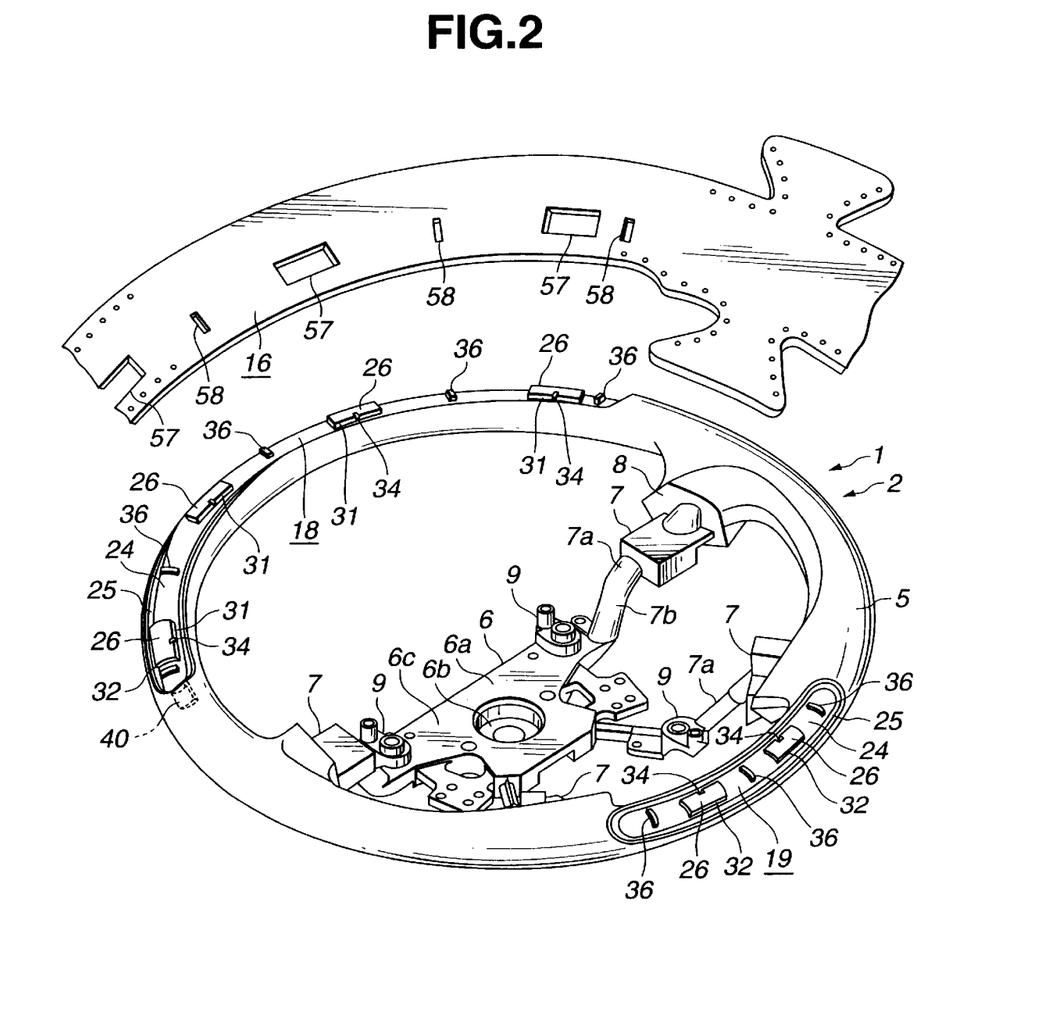
FIG. 2 is a partly developed view of the steering wheel showing a skin member independently, according to the preferred embodiment of the present invention.
Figure 3:
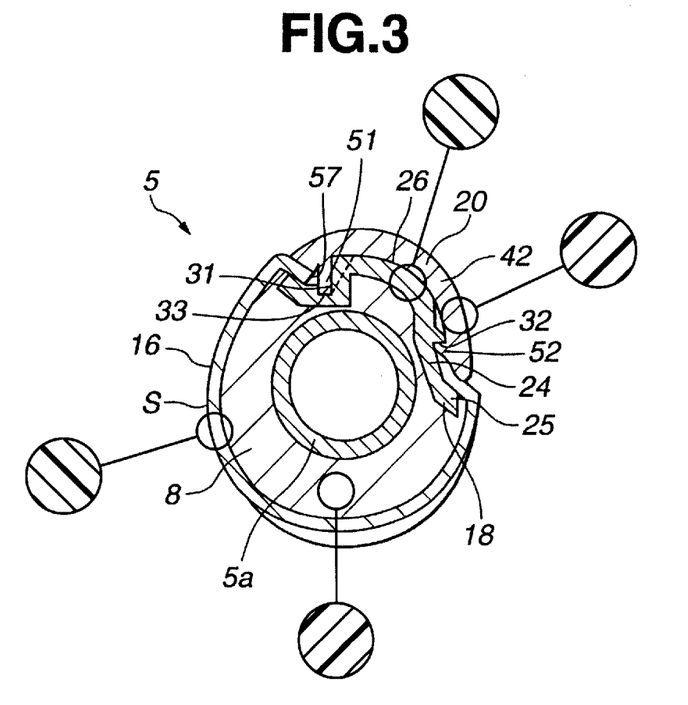
FIG. 3 is a cross section III—III of the steering wheel shown in FIG. 1, according to the preferred embodiment of the present invention.
Figure 4:
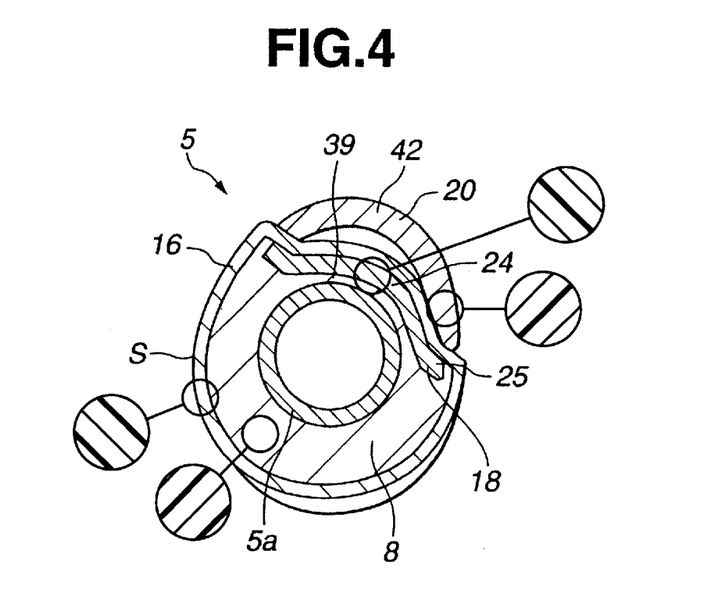
FIG. 4 is a cross section IV—IV of the steering wheel shown in FIG. 1, according to the preferred embodiment of the present invention.
Figure 6:
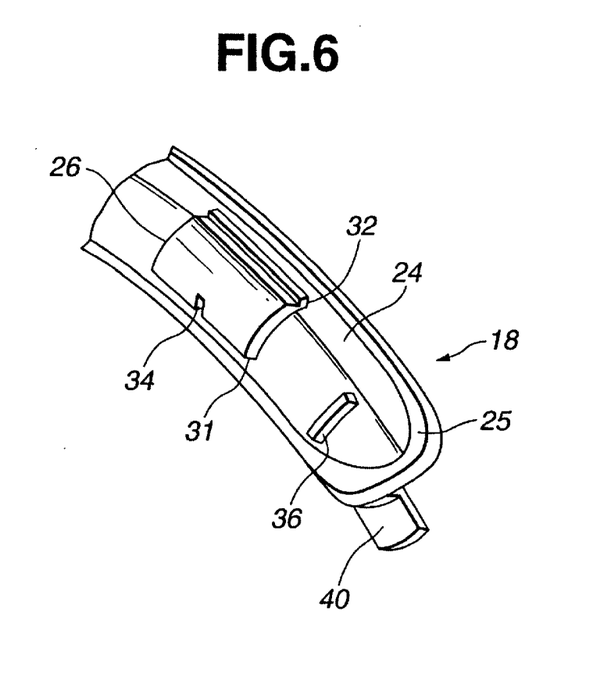
FIG. 6 is a perspective view showing a part of a mount member of the steering wheel, according to the preferred embodiment of the present invention.

There are formed a plurality of raised portions 26 at certain intervals on the outer surface of the main portion 24 of each mount member 18 or 19. Each raised portion 26 is substantially rectangular in the plan view. Each raised portion 26 has an upper surface curved along the back or lower surface of the first or second finisher 20 or 21. Each raised portion 26 has a first sidewall surface 31 facing radially inwardly toward the center of the steering wheel, and a second sidewall surface 32 facing radially outwardly. As is seen in FIG. 3, the main portion 24 has a groove 33 along the first sidewall surface 31. As is seen in FIGS. 2 and 6, there is formed a cut-out 34 for positioning purpose in the middle of a lengthwise direction of the first sidewall surface 31. The first sidewall surface 31 is not in parallel with the second sidewall surface 32, but intersects with the second sidewall surface 32. In this embodiment, such intersection is substantially right-angled.

Moreover, the main portion 24 of each mount member 18 or 19 has on the outer surface thereof a plurality of plate-like support portions 36 projecting upwards. In this example, each support portion 36 is positioned between adjacent two of the raised portions 26, or at the side of one raised portion 26.

Figure 5:
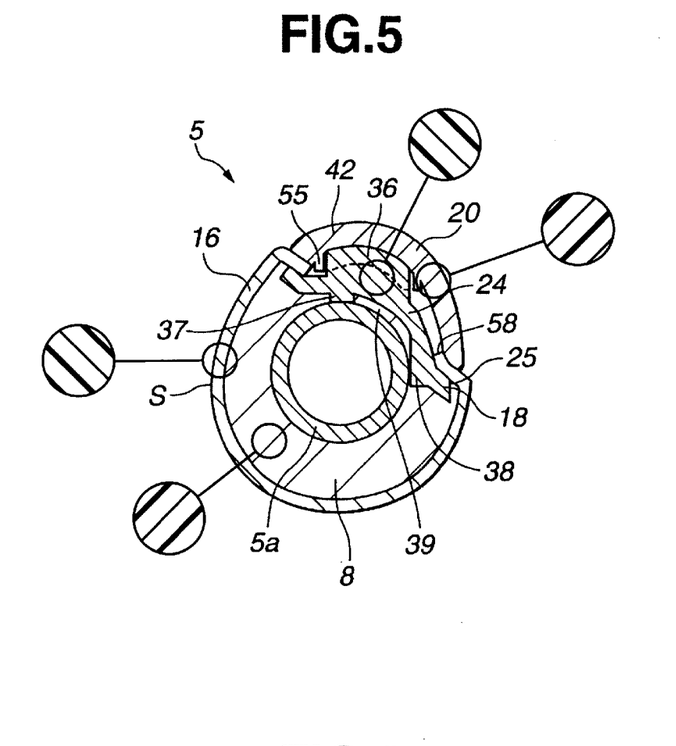
FIG. 5 is a cross section V—V of the steering wheel shown in FIG. 1, according to the preferred embodiment of the present invention.

As shown in FIG. 5, the main portion 24 has on the inner surface thereof pairs of first and second inward projections 37 and 38. Each of the pairs is positioned between adjacent two of the raised portions 26, or at the side of one raised portion 26. The first projection 37 is cylindrical, while the second projection 38 is shaped like a plate. The first and second projections 37 and 38 project radially inwardly toward the rim core 5a, abut against the rim core 5a, and thereby define a space 39 between the inner surface of the main portion 24 and the rim core 5a. The polyurethane cover 8 is formed in the space 39.

In this embodiment, the first mount member 18 has four of the raised portions 26 and five of the support portions 36. Of the five support portions 36, each of three is disposed between adjacent two raised portions 26, and the remaining two are disposed at both ends. The pairs of first and second projections 37 and 38 are disposed on the inner side of one support portion 36, and are formed at five places. On the other hand, the second mount member 19 has two of the raised portions 26 and three of the support portions 36. Of the three support portions 36, one is disposed between adjacent two raised portions 26, and the remaining two are disposed at both ends. The pairs of first and second projections 37 and 38 are disposed on the inner side of one support portion 36, and are formed at three places.

The main portion 24 of the first mount member 18 extends from a first end to a second end circumferentially along the rim grip 5, and has two fixation portions 40, respectively, at the first and second ends of the main portion 24 of the mount member 18. As shown in FIG. 6, each fixation portion 40 projects from the inner side of the first or second end of the main portion 24. Both fixation portions 40 are embedded in the cover 8.

Each of the first and second finishers 20 and 21 is a single piece of resin such as acrylonitrile butadiene styrene copolymer (ABS), acrylonitrile butadiene styrene copolymer containing glass fiber, polycarbonate, acrylonitrile butadiene styrene copolymer (ABS) containing polycarbonate. In this embodiment, each of the first and second finishers 20 and 21 is made of acrylonitrile butadiene styrene copolymer containing 10% by weight of glass fiber. The first and second finishers 20 and 21 are, respectively, mounted on and engaged with the first and second mount members 18 and 19.

Each of the first and second finishers 20 and 21 has a main portion 42 extending circumferentially like a circular arc in a plan view and having a cross section curved like a circular arc. The main portion 42 is formed in a curved plate in such a manner as to cover the main portion 24 of the corresponding mount member 18 or 19. The main portion 42 has a smoothly curved outer surface. Various kinds of ornaments can be made on the outer surface of the main portion 42, such as wood grain printing by a liquid pressure transfer technique, painting, stick of sheet or film, and in-mold coating of sheet or film.

Figure 7:
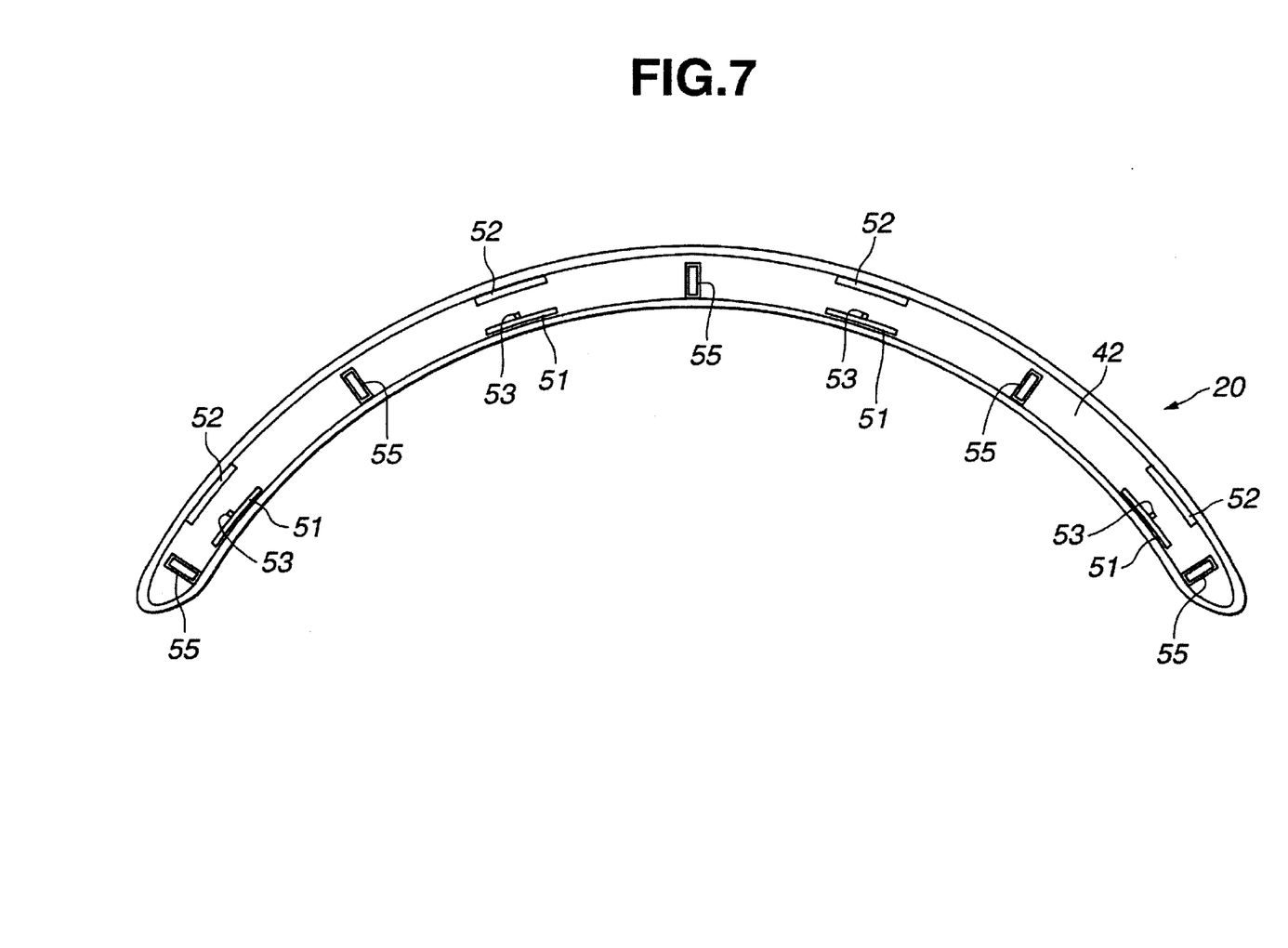
FIG. 7 is a bottom view of a finisher of the steering wheel, according to the preferred embodiment of the present invention.

As is seen in FIG. 7, on the inner surface of the main portion 42, there are provided a plurality of grip portions each including first and second engagement projections 51 and 52. The grip portions are arranged at regular intervals, and each grip portion is located at a position corresponding to one of the raised portions 26. The first engagement projections 51 are arranged along the inner periphery of the main portion 42, and the second engagement projections 52 are along the outer periphery, as shown in FIG. 7. Each first engagement projection 51 projects inwardly like a plate, and each second engagement projection 52 projects inwardly in the shape of a triangle in cross section, as shown in FIG. 3. The first and second engagement projections 51 and 52 project in two different inward directions toward the rim core 5a. In other words, the projection of the first engagement projection 51 forms a right angle with the projection of the second engagement projection 52. In the example shown in FIG. 3, the first engagement projection 51 projects downwards while the second engagement projection 52 projects horizontally from the position lower than the position of the first engagement projection 51. Each of the first engagement projections 51 has a positioning projection 53 projecting from the longitudinal middle of the first engagement projection 51 between both ends thereof. Each of the first engagement projections 51 extends circumferentially around the center of the steering wheel whereas the positioning projection 53 of each first engagement projection 51 projects radially outwardly toward the mating second engagement projection 52, as shown in FIG. 7. Each positioning projection 53 forms substantially a right angle with the corresponding first engagement projection 51.

Moreover, on the inner or back surface of the main portion 42, there are provided a plurality of recesses 55 at regular intervals. Each of the recesses 55 is positioned corresponding to the support portion 36 of the first or second mount members 18 or 19. Each of the recesses 55 has a projective fringe therearoud, and is shaped into a rectangular frame in such a manner as to receive the corresponding support portion 36.

In this embodiment, the first finisher 20 has four grip portions and five recesses 55. Of the five recesses 55, three are disposed between adjacent two grip portions, and the remaining two are disposed at both ends. On the other hand, the second finisher 21 has two grip portions 48, and three recesses 55. Of the three recesses 55, one is disposed between adjacent two grip portions, and the remaining two are disposed at both ends.

Furthermore in this embodiment, the first and second finishers 20 and 21 can change the grip portions 48 and recesses 55 thereof with the raised portions 26 and support portions 36 of the first and second mount members 18 and 19.

As is seen in FIG. 2, the skin member 16 covering the rim grip 5 is a sheet of natural material or synthetic resin such as leather or artificial leather. The skin member 16 has first and second openings 57 and 58 respectively formed into rectangle and slit. The first and second openings 57 and 58 are preliminarily formed through mold cutting or the like in such a manner as to correspond respectively to the raised portion 26 and support portion 36 of the first and second mount members 18 and 19. In areas occupied by the first and second finisher mount members 18 and 19, the skin member 16 is so sized in its width that the skin member 16 does not deteriorate the external appearance of the steering wheel 1 after being sewed for covering the rim grip 5. More specifically, for sewing the skin member 16 to the rim grip 5, a stitch string S is to be used. This stitch string S is made of natural material or resin such as cotton, leather or nylon. The skin member 16 is tailored comparatively short in width for securing such a strong tensile force as is required for what is called "baseball stitch" or "zigzag stitch."

Recited below is a manufacturing process of the rim grip 5 of the steering wheel body 2 according to this embodiment of the present invention.

At first, the first and second mount members 18 and 19 are disposed at predetermined positions of a metal mold for insert molding. The rim core 5a of the steering wheel body 2 is disposed on the first and second mount members 18 and 19. In this state, the resin material is introduced into the metal mold for carrying out an insert molding (polyurethane reaction injection molding) so as to form the cover 8. The first and second mount members 18 and 19 are firmly fixed to the cover 8 by insert molding in the state in which the first and second mount members 18 and 19 face upwardly.

Then, as is seen in FIG. 2, the first and second openings 57 and 58 of the skin member 16 are respectively inserted into and aligned with the raised portions 26 and the support portions 36 of the first and second mount members 18 and 19. The skin member 16 is wound around the rim grip 5, and is sewed in a stitching manner such as what is called "baseball stitch" or "zigzag stitch" with strong tensile force applied. It is possible to bond the back surface of the skin member 16 to the cover 8 of urethane with adhesive or double-sided adhesive tape.

As is seen in FIGS. 1 and 2, the first and second finishers 20 and 21 are attached, respectively, to the first and second mount members 18 and 19 by pushing along the axial direction of the steering shaft until each raised portion 26 is engaged between the corresponding first and second engagement projections 51 and 52. In this state, the first and second engagement projections 51 and 52 of each grip portion 48 are respectively engaged with the first and second sidewall surfaces 31 and 32 of the corresponding raised portion 26. In addition, each support portion 36 is fit in the corresponding recess 55, and the engagement between the support portions 36 and recesses 55 improves the accuracy in positioning. In this case, it is optional to use adhesive for bonding between the engagement projections 51 and 52 and the sidewall surfaces 31 and 32, and/or between the support portions 36 and recesses 55.

Under this condition, the periphery of each of the first and second openings 57 and 58 of the skin member 16 is clamped between the peripheral edge of the first or second finisher 20 or 21, and the plate-like rim 25 of the first or second mount member 18 or 19.

Furthermore in this embodiment, the first and second finishers 20 and 21 can change the grip portions and recesses 55 thereof with the raised portions 26 and support portions 36 of the first and second mount members 18 and 19.

This embodiment makes it possible to improve the external appearance of the steering wheel 1 with at least one of the first and second finishers 20 and 21 mounted on the rim grip 5.

With the interposition of the mount members 18 and 19 of harder material, this embodiment further makes it possible to readily and firmly fix the first and second finishers 20 and 21 to the cover 8 which is softer and hence inadequate for direct fixing. There is no need for making the cover 8 hard to support the finishers 20 and 21. Therefore, the cover 8 can provide soft and pleasant feel to the surface of the rim grip 5. Moreover, it is possible to use, as the rim core 5a, ordinary cylindrical metal pipe without the necessity to modify the configuration of the rim core 5a for supporting the finishers. The first and second mount members 18 and 19 can be readily and firmly fixed to the cover 8 with high assembly accuracy through the insert molding, thus reducing the manufacturing cost. In addition to the insert molding, the first and second mount members 18 and 19 can be engaged with the rim core 5a.

By eliminating the need for fixing the finishers 20 and 21 directly to the cover 8, the first and second mount members 18 and 19 can improve the flexibility or versatility of the finishers 20 and 21, and facilitate replacement and repairs.

The first and second engagement projections 51, 52 on the back sides of the first and second finishers 20 and 21 project radially inwardly toward the center of the rim core 5a in the two different radial inward directions, as shown in FIG. 3. This arrangement facilitates and secures the engagement between the first and second finishers 20 and 21 and the first and second mount members 18 and 19.

The support portions 36 projecting from the surface of the first and second mount members 18 and 19 toward the first and second finishers 20 and 21 can prevent the first and second finishers 20 and 21 from being bent, thus improving the external appearance. The finishers 20 and 21 supported by the support portions 36 can preserve good feeling of grip without being warped by the grip of a driver, and thereby improve the feeling of steering operation. The shape of the projecting support portions 36 is not limited to a plate or rib. The support portions 36 also can be shaped into various kinds of projections such as pin.

As is seen in FIG. 5, each of the first and second mount members 18 and 19 has, on the inner surface of the main portion 24, the first and second projections 37 and 38 abutting against the rim core 5a, and forms, between the inner surface of the main portion 24 and the rim core 5a, the space 39 for filling therein the polyurethane cover 8, so that the rim core 5a is fully covered with polyurethane. Therefore, the metal rim core 5a and the first and second mount members 18 and 19 of ABS resin arc firmly and accurately fixed together with the interposition of the cover 39 of urethane with reduced assembly errors.

The fixation portions 40 are provided at both ends of the long first mount member 18, and embedded in the cover 8. Therefore, the first mount member 18 can be secured to the rim grip 5 in the entire length of the first mount member 18, especially, at each end of the first mount member 18, thus improving the external appearance. The firmly attached mount members are free from looseness, and proper for the feeling of driver's grip and steering operation. By leaving unremoved flashes around the periphery of the fixation portions 40, or by forming flash-like portions around the peripheries of the fixations 40, the fixation portions 40 can be fixed more securely.

Each of the raised portions 26 projecting from the first or second mount member 18 or 19 has a curved upper surface contacting the curved inner surface of the first or second finisher 20 or 21 over a broad contact area. By applying adhesive to these contact areas, the first and second mount members 18 and 19 can be more securely fixed to the first and second finishers 20 and 21.

Stated in this paragraph is about the cover 16. At first, the positions are cut at which the first and second mount members 18 and 19 are directly with the first and second finishers 20 and 21. In other words, the positions at which the raised portions 26 having the first and second sidewall surfaces 31 and 32 are engaged with the grip portions, and the other positions at which the support portions 36 are engaged with the recesses 55. Thereby, the skin member 16 has the first and second openings 57 and 58 into which the raised portions 26 and the support portions 36 are respectively inserted. With only the first and second openings 57 and 58 cut, namely, the skin member 16 having a minimum cut area, the skin member 16 can be wound in an accurate position, thus enabling various kinds of sewing methods. For example, when the skin member 16 is sewed in a stitching manner such as what is called "baseball" or "zigzag" method requiring high tensile force, the cut out end portions are not exposed, thus securing good external appearance. Since the skin member 16 is disposed on the back surface of the first and second finishers 20 and 21, and sewed with high tensile force, it is possible to make a small winding diameter, namely, small area, thus reducing the manufacturing cost.

The quantity, shape and position of the sidewall surfaces and engagement projections to be disposed respectively on the first and second mount members 18 and 19 and the first and second finishers 20 and 21 can be determined according to the shape and dimensions of the main portion 24 and main portion 42. For instance, it is optional to make the pair of the first and second sidewall surfaces 51 and 52 plural or singular, likewise, the corresponding pair of the first and second sidewall surfaces 31 and 32 plural or singular. For another instance, in case the pair of the sidewall surfaces and engagement projection is disposed close to its counterparts, the support portion 36 put between two such pairs is not required. This support portion 36 is used for preventing the first or second mount member 18 or 19 from being bent.

Instead of being the same, the materials for the first and second mount members 18 and 19 can be different from those for the first and second finishers 20 and 21.

Moreover, the main portion 24 of the first and second mount members 18 and 19 can be adhered to the rim core 5a without forming projections on the inner surface of the main portion 24.

Furthermore, the skin member 16 can be omitted, or made integrally on the surface of the cover 8.

What is claimed is:

1. A steering wheel which comprises:
   a) a rim core;
   b) a rim cover covering at least a part of the rim core;
   c) a mount member mounted on the rim cover; and
   d) a finisher so mounted on the mount member as to be exposed on a surface of a steering wheel rim, said finisher comprising a main portion having an outside surface exposed outwardly, and a pair of first and second engagement projections projecting inwardly from the main portion in two different directions from each other in order to bring the finisher into engagement with the mount member, said main portion extending circumferentially around the rim core from a first circumferential position to a second circumferential position spaced circumferentially from the first circumferential position,
      in which the first and second engagement projections project inwardly toward the rim core, respectively from the first and second circumferential positions, and in which the mount member comprises a raised portion, and the finisher grips the raised portion of the mount member with the first and second engagement projections.

2. A steering wheel which comprises:
a) a rim core;
b) a rim cover covering at least a part of the rim core;
c) a mount member mounted on the rim cover; and
d) a finisher so mounted on the mount member as to be exposed on a surface of a steering wheel rim,
in which one of the mount members and the finisher comprises a support portion projecting toward the other, and
in which the other of the mount member and the finisher comprises a recess receiving the support portion projecting from the one of the mount member and the finisher.

3. A steering wheel which comprises:
a) a rim core;
b) a rim cover covering at least a part of the rim core;
c) a mount member mounted on the rim cover; and
d) a finisher so mounted on the mount member as to be exposed on a surface of a steering wheel rim, and
in which the mount member comprises a main portion and a fixation portion embedded in the rim cover.

4. A steering wheel as recited in claim 3, in which the main portion of the mount member extends from a first end to a second end, and the fixation portion is formed at each of the first and second ends of the main portion of the mount member.

5. A steering wheel which comprises:
a) a rim core;
b) a rim cover covering at least a part of the rim core;
c) a mount member mounted on the rim cover; and
d) a finisher so mounted on the mount member as to be exposed on a surface of a steering wheel rim, and
in which the mount member further comprises a pair of first and second projections projecting from a main portion toward the rim core and defining a space between the rim core and the main portion of the mount member, and
in which the rim cover is made of resin and comprises a portion filling the space.

6. A steering wheel as recited in claim 5, in which the resin of the rim cover is polyurethane, and in which the first and second projections abut on the rim core.

7. A steering wheel which comprises:
a) a rim core;
b) a rim cover covering at least a part of the rim core;
c) a mount member mounted on the rim cover; and
d) a finisher so mounted on the mount member as to be exposed on a surface of a steering wheel rim, and
in which the steering wheel further comprises a skin member covering the rim cover, and the skin member comprises a sandwiched portion between the mount member and the finisher.

8. A steering wheel as recited in claim 7, in which the sandwiched portion of the skin member is formed with an opening through which the finisher and the mount member are engaged with each other.

9. A steering wheel as recited in claim 8, in which both the finisher and the mount member extend along the rim core and the rim cover of the steering wheel, one of the mount member and the finisher comprises a plurality of raised portions arranged along the rim core and the rim cover, the other of the mount member and the finisher comprises a plurality of grip portions arranged along the rim core and the rim cover, the skin member comprises a plurality of the openings arranged along the rim core and the rim cover, each of the grip portions grips a unique one of the raised portions, and each of the raised portions is received in a unique one of the openings of the skin member.

10. A steering wheel as recited in claim 9, in which each of the raised portions comprises first and second sidewall surfaces extending along the rim core and the rim cover of the steering wheel, and each of the grip portions comprises a first engagement projection abutting against the first sidewall surface of a corresponding one of the raised portions and a second engagement projection abutting against the second sidewall surface of the corresponding one of the raised portions.

11. A steering wheel which comprises:
a core;
a cover covering at least a part of the core;
a mount member mounted on the cover;
a finisher mounted on the mount member;
a skin member covering the cover, the skin member comprising a sandwiched portion between the mount member and the finisher, the sandwiched portion of the skin member being formed with an opening through which the finisher and the mount member are engaged with each other, and wherein both the finisher and the mount member extending along a rim of the steering wheel, one of the mount member and the finisher comprises a plurality of raised portions arranged along the rim, the other of the mount member and the finisher comprises a plurality of grip portions arranged along the rim, the skin member comprises a plurality of the openings arranged along the rim, each of the grip portions grips a unique one of the raised portions, and each of the raised portions is received in a unique one of the openings of the skin member.

12. A steering wheel as recited in claim 11, in which each of the raised portions comprises first and second sidewall surfaces extending along the rim of the steering wheel, and each of the grip portions comprises a first engagement projection abutting against the first sidewall surface of a corresponding one of the raised portions and a second engagement projection abutting against the second sidewall surface of the corresponding one of the raised portions.

* * * * *